(12) United States Patent
Xiao et al.

(10) Patent No.: US 7,774,224 B2
(45) Date of Patent: Aug. 10, 2010

(54) METHODS AND APPARATUSES FOR ORGANIZING EVENTS

(75) Inventors: Youneng Xiao, Shanghai (CN); Hartmut K. Vogler, Foster City, CA (US); Qiwei Zhang, Shanghai (CN)

(73) Assignee: SAP AG, Walldorf (DE)

( * ) Notice: Subject to any disclaimer, the term of this patent is extended or adjusted under 35 U.S.C. 154(b) by 460 days.

(21) Appl. No.: 11/601,466

(22) Filed: Nov. 16, 2006

(65) Prior Publication Data
US 2008/0120158 A1    May 22, 2008

(51) Int. Cl.
*G06F 9/44*    (2006.01)
(52) U.S. Cl. .......................................................... 705/9
(58) Field of Classification Search ....................... 705/9
See application file for complete search history.

(56) References Cited

U.S. PATENT DOCUMENTS

| | | | | |
|---|---|---|---|---|
| 5,524,253 A * | 6/1996 | Pham et al. | ................... | 709/202 |
| 5,778,346 A * | 7/1998 | Frid-Nielsen et al. | ........... | 705/9 |
| 5,794,234 A * | 8/1998 | Church et al. | ................... | 707/4 |
| 5,884,035 A * | 3/1999 | Butman et al. | ............... | 709/218 |
| 6,065,009 A * | 5/2000 | Leymann et al. | ............... | 707/10 |
| 6,151,608 A * | 11/2000 | Abrams | ....................... | 707/204 |
| 6,604,079 B1 * | 8/2003 | Ruvolo et al. | ................... | 705/1 |
| 6,678,712 B1 * | 1/2004 | McLaren et al. | ............. | 718/100 |
| 6,760,728 B1 * | 7/2004 | Osborn | .......................... | 707/10 |
| 7,013,306 B1 * | 3/2006 | Turba et al. | .................. | 707/101 |
| 7,096,232 B2 * | 8/2006 | Doss et al. | ................ | 707/104.1 |
| 7,181,689 B2 * | 2/2007 | Mock et al. | ................... | 715/703 |
| 7,213,039 B2 * | 5/2007 | Ramanujam et al. | ......... | 707/203 |
| 7,219,109 B1 * | 5/2007 | Lapuyade et al. | ............ | 707/200 |
| 7,346,616 B2 * | 3/2008 | Ramanujam et al. | ............ | 707/8 |
| 7,395,221 B2 * | 7/2008 | Doss et al. | ....................... | 705/9 |
| 2001/0014867 A1 * | 8/2001 | Conmy | ........................... | 705/9 |
| 2001/0039540 A1 * | 11/2001 | Hofmann et al. | ................ | 707/3 |
| 2003/0187849 A1 * | 10/2003 | Ruby et al. | .................... | 707/10 |
| 2004/0064355 A1 * | 4/2004 | Dorenbosch et al. | ............ | 705/9 |
| 2005/0102245 A1 * | 5/2005 | Edlund et al. | ................. | 705/80 |
| 2007/0078877 A1 * | 4/2007 | Ungar et al. | ................. | 707/101 |
| 2007/0214188 A1 * | 9/2007 | Lapuyade et al. | ............ | 707/200 |

FOREIGN PATENT DOCUMENTS

| | | |
|---|---|---|
| EP | 1172746 | 1/2002 |
| EP | 1227644 | 7/2002 |
| EP | 1605374 | 12/2005 |
| EP | 1696315 | 8/2006 |

OTHER PUBLICATIONS

European Search Report mailed Mar. 27, 2008, for related European patent application No. 07020535.6, filed Oct. 19, 2007, 8 pages.

\* cited by examiner

*Primary Examiner*—Romain Jeanty
(74) *Attorney, Agent, or Firm*—Blakely, Sokoloff, Taylor & Zafman, LLP

(57) ABSTRACT

Techniques for organizing events via an electronic organizer are described herein. In one embodiment, an example of a process includes, but is not limited to, dynamically accessing a first event organization system over a network to retrieve a first event data representing one or more events scheduled by the first event organization system, and presenting the first event data in a second event organization system as if the first event data is scheduled by the second event organization system, wherein the first and second event organization systems are incompatible. Other methods and apparatuses are also described.

20 Claims, 11 Drawing Sheets

METHODS AND APPARATUSES FOR ORGANIZING EVENTS

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to data processing. More particularly, this invention relates to event organization and processing.

BACKGROUND

In today's workplace, timing is everything. Improving time management in an organization or in certain groups begins with coordinating the date/time of all contacts in specified environments such as a company, a department, a team, or business partners etc., which greatly improves collaboration efforts, saves time, and saves money by increasing the information efficiency within a group.

The most commonly used time management tools for the today's computer users are Microsoft Outlook, IBM Lotus organizer, and Google calendar, etc. Those tools give users a structure or protocol for scheduling time, creating tasks and contacts. Those calendar tools also provide a platform for group sharing and exchange of information. With these tools a user can establish multiple private (e.g., mailbox) and public (e.g., group) folders. Using these folders, the user can create calendar appointments (e.g., public or private), create contacts, and create personal tasks.

However, many users have to copy their appointments, or transfer calendar data from one calendar to another. Those main calendar tools do not have the technical capability to synchronize with each other automatically. There is no automatic centralized calendar which would enable users to view an entire organizational calendar or business partners' calendar at a glance.

FIG. 1 is a diagram illustrating a graphical user interface (GULT) of a conventional calendar tool. In this example, referring to FIG. 1, user 101 is an organizer of an event. User 102 is in the same company with user 101. As a result, user 101 can see user 102's free time from user 101's calendar tools directly as shown in area 104. While user 103 is user 101's customer, user 103 uses a different calendar tool. As a result, user 101 cannot read user 103's calendar data, and cannot see user 103's free time as shown in area 105. Rather, user 101 has to call user 103 or write email to user 103 to find out user 103's free time.

In addition, with the progress of telecom and transportation techniques, the world has grown to be more of a global community. As such, business partners or customers may be distributed all over the world and located in different time zones. For example, 10:00 AM is a good time for one person to hold a meeting, but maybe its business partners or customers are out of their offices. Currently most of main calendar tools do not display the attendee's local time when scheduling a meeting or an appointment. One has to convert the time zones manually.

Further, most calendar tools provide a reminder function, which is designed to keep track and remind a user of an event before the event occurs. Usually a reminder will pop up a window on the attendee's desktop certain period of time before the event. Currently, the reminder time is fixed when an organizer or sender drafts the event.

SUMMARY OF THE DESCRIPTION

Techniques for organizing events via an electronic organizer are described herein. In one aspect of the invention, an example of a process includes, but is not limited to, dynamically accessing a first event organization system over a network to retrieve a first event data representing one or more events scheduled by the first event organization system, and presenting the first event data in a second event organization system as if the first event data is scheduled by the second event organization system, wherein the first and second event organization systems are incompatible.

According to another aspect of the invention, an example of a process includes, but is not limited to, displaying an event in a first timeline according to a first locality associated with a first user participating the event, and displaying the event in a second timeline according to a second locality associated with a second user participating the event, wherein the first locality is different than the second locality.

According to a further aspect of the invention, an example of a process includes, but is not limited to, in response to an event held at a predetermined time of a predetermined location and scheduled via an electronic event organizer, dynamically determining a real-time extrinsic factor affecting traveling time from a location of the electronic event organizer to the predetermined location, and configuring a reminder of the event via the electronic event organizer, the reminder having an amount of time with respect to the predetermined time based on the determined real-time extrinsic factor.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
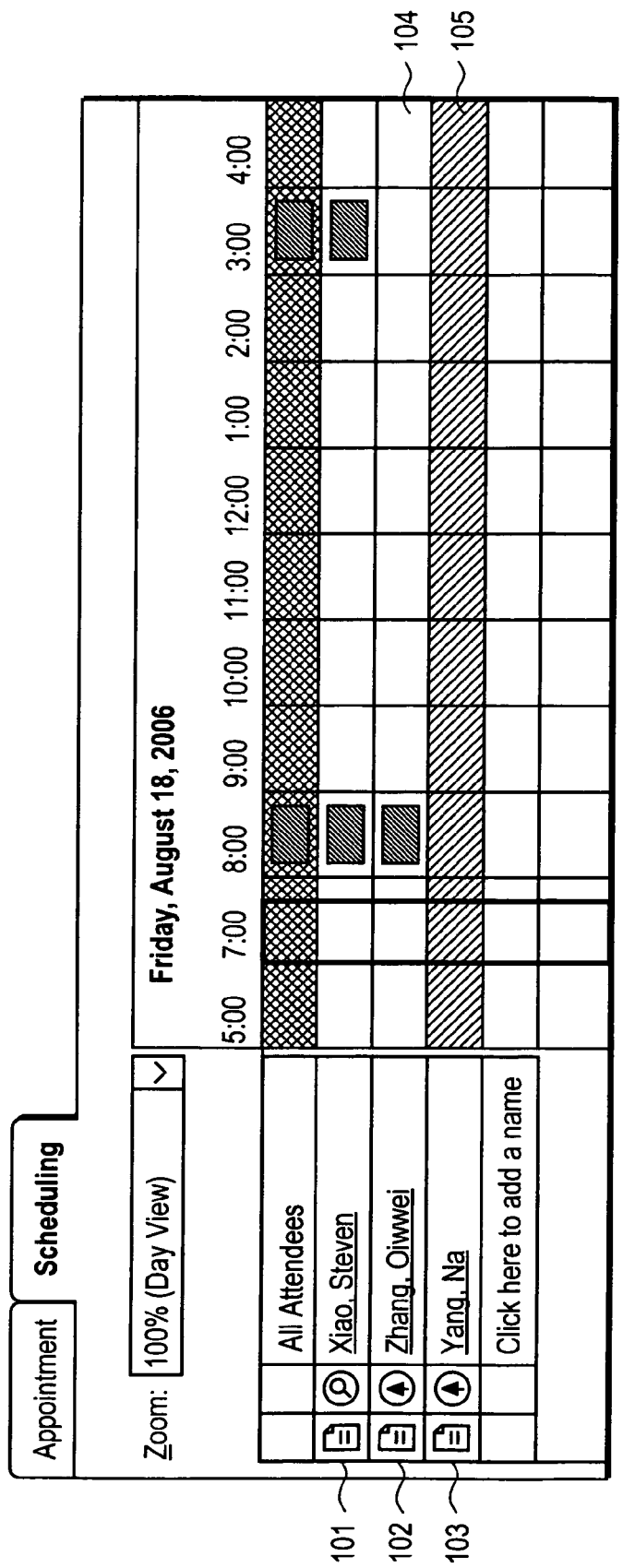
FIG. 1 is a diagram illustrating a graphical user interface (GUI) of a conventional calendar tool.

Techniques for organizing events via an electronic organizer are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Globalization is a trend in the current business environments. It provides more and more opportunities to organizations. Many organizations have their subsidiary organizations, employees, business partners and customers all over the world. At the same time, globalization also addresses challenges to the tradition routines. It requires that we take a global point of view to manage our work and time. According to certain embodiments of the invention, an electronic organizer such as electronic calendar may include at least one of the following functionalities:

Synchronize calendar tools with the external calendar data

Take time zone into consideration in calendar tool UI

Give reasonable reminder time according to attendee's context

For illustration purposes only, an electronic calendar is used as an example of an electronic organizer or event organizer. However, it is not so limited, other types of electronic organizers may also be applied.

Synchronize Calendar Tools with External Calendar Data

Usually a company uses the same calendar tool inside company all over the world, and calendar data may be stored in a server. So calendar data synchronized inside company is generally not a problem (also referred to as internal calendar data or event data), unless users within the same company use different incompatible calendar tools. However, not all the business partners and customers use the same calendar tool as an Enterprise, so their calendar data formats are different and may be incompatible with each other. When one organizer creates an event whose attendees include external customers, the organizer needs to know the free time of all attendees. But the data formats of external attendees are different, so the organizer cannot utilize the calendar tools to directly read an external attendee's free time. In this case, according to one embodiment, a calendar tool has the capability to read business partners or customers calendar data, and then transform the calendar data to a data format the organizer's calendar tool can recognize. The transformed calendar data can be presented within a user interface of an organizer as if the transformed calendar data is generated locally.

Figure 2:
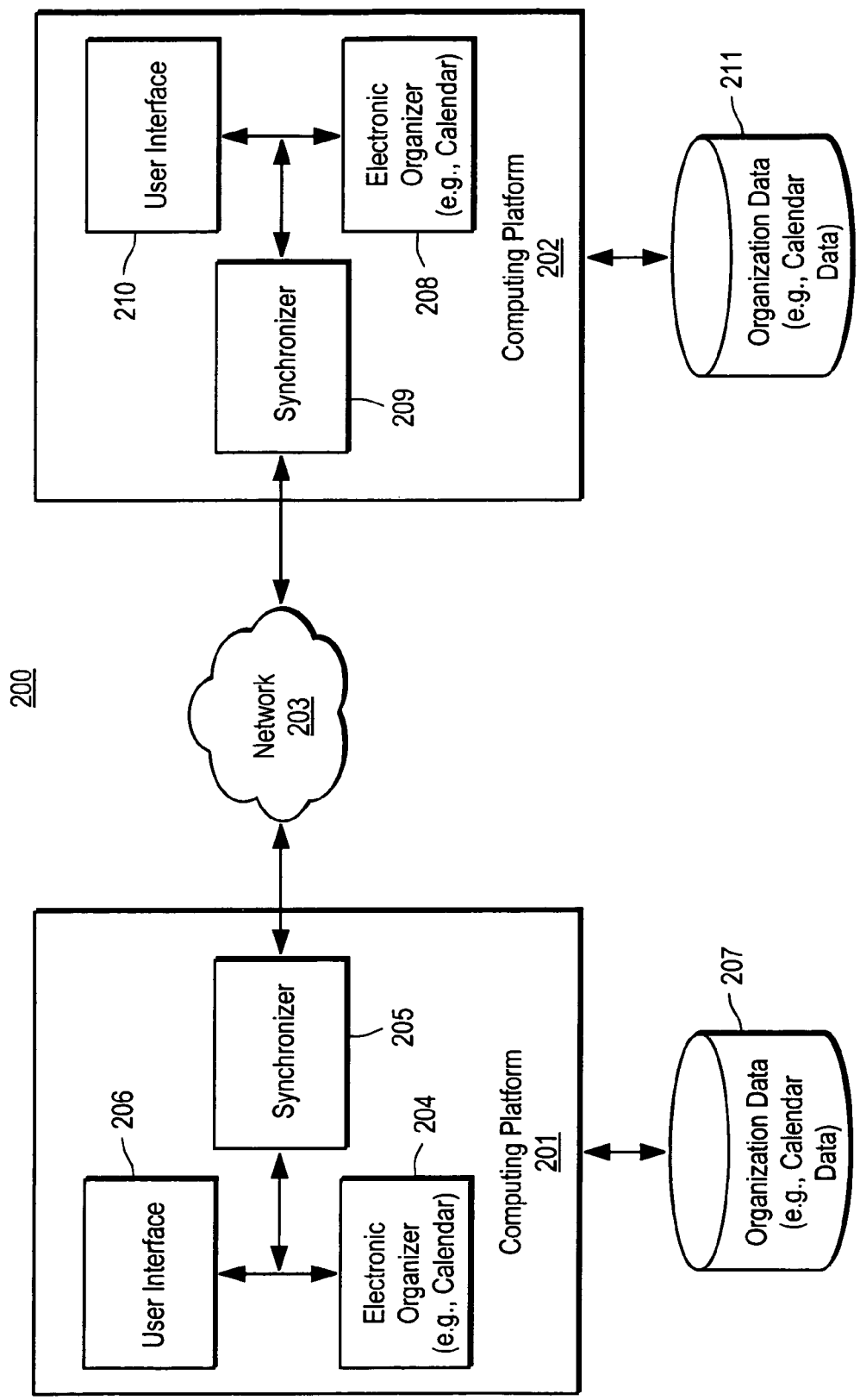
FIG. 2 is a block diagram illustrating a system configuration of synchronizing event data according to one embodiment of the invention.
Figure 11:
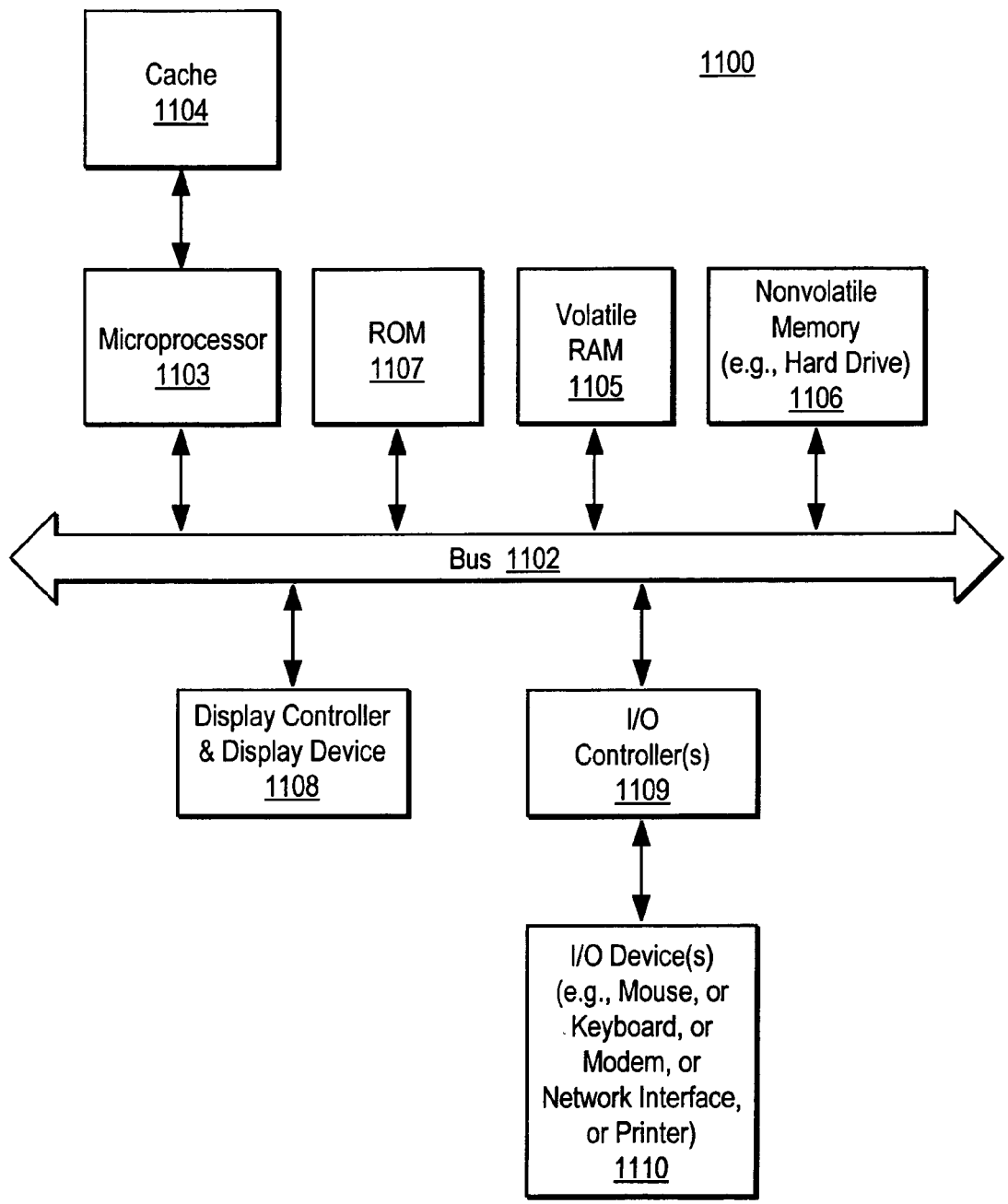
FIG. 11 is a block diagram of a digital processing system, which may be used with one embodiment of the invention.

FIG. 2 is a block diagram illustrating a system configuration of synchronizing event data according to one embodiment of the invention. Referring to FIG. 2, according to one embodiment, system configuration 200 includes, but is not limited to, a first computing platform 201 communicatively coupled to a second computing platform 202 over a network 203. Computing platforms 201-202 may be a personal computer (e.g., a desktop, laptop, or workstation), a portable device (e.g., a media player), a personal digital assistant (PDA), a cellular phone, a personal communicator (e.g., a Blackberry or similar devices), or a combination of at least two of these. Computing platforms 201-202 may be implemented similar to those configurations as shown in FIG. 11, which will be described in details further below.

In one embodiment, network 203 may be a local area network (LAN) (e.g., Intranet) or a wide area network (WAN) (e.g., Internet). Network 203 may include multiple networks or sub-networks. Platforms 201-202 may communicate with each other in a client-server configuration or alternatively, platforms 201-202 may communicate with each other in a peer-to-peer configuration. Platforms 201-202 may communicate with each other via a variety of communication protocols, such as, for example, TCP/IP (transport control protocol/Internet protocol) or Ethernet protocols. Although only two computing platforms 201-202 are shown for the purposes of illustration, more or fewer computing platforms may be applied.

Referring back to FIG. 2, computing platform 201 includes, but is not limited to, an electronic organizer 204, user interface 206, and a synchronizer 205. Electronic organizer 204 may be a calendar application or tool available from a variety of vendors, such as Outlook from Microsoft or electronic organizer from IBM Lotus or electronic organizer from Google. Electronic organizer 204 may includes some or all of the necessary or well-known components that are normally available in a standard electronic organizer. User interface 206 may be used to present or display the data or information provided by the electronic organizer 204 including, for example, scheduled events or meetings, etc.

In addition, according to one embodiment, synchronizer 205 is coupled to the organizer 204 and/or user interface 206 to synchronize other event data or calendar data from a remote organizer of a remote platform such as organizer 208 of platform 202 over a network. Synchronizer 205 may be implemented as a part of organizer 204. Alternatively, synchronizer 205 may be implemented as a stand alone application communicatively coupled to the organizer 204 (e.g., via an API or a plug-in interface).

Further, according to one embodiment, computing platform 201 may be communicatively coupled one or more databases or storages 207 for storing data or information utilized by the organizer 204 and/or synchronizer 205. Database or storage 207 may be implemented locally with respect to platform 201 or alternatively, remotely over a network. For example, database or storage 207 may be implemented as a part of an enterprise information system (EIS) of an organization or enterprise entity, such as, an ERP (enterprise resource planning) system.

Similarly, computing platform 202 includes, but is not limited to, an electronic organizer 208, user interface 210, and a synchronizer 209. Electronic organizer 208 may be a calendar application or tool available from a variety of vendors as described above. Electronic organizer 208 may includes some or all of the necessary or well-known components that are normally available in a standard electronic organizer. User interface 210 may be used to present or display the data or information provided by the electronic organizer 208 including, for example, scheduled events or meetings, etc.

In addition, according to one embodiment, synchronizer 209 is coupled to the organizer 208 and/or user interface 210 to synchronize other event data or calendar data from a remote organizer of a remote platform such as organizer 204 of platform 201 over a network. Synchronizer 209 may be implemented as a part of organizer 208. Alternatively, synchronizer 209 may be implemented as a stand alone application communicatively coupled to the organizer 208 (e.g., via an API or a plug-in interface).

Further, according to one embodiment, computing platform 202 may be communicatively coupled one or more databases or storages 211 for storing data or information utilized by the organizer 208 and/or synchronizer 209. Database or storage 211 may be implemented locally with respect to platform 202 or alternatively, remotely over a network. For example, database or storage 211 may be implemented as a part of an enterprise information system (EIS) of an organization or enterprise entity, such as, an ERP (enterprise resource planning) system.

According to one embodiment, typically, when platforms 201-202 belong to different organization or enterprise entities and their respective electronic organizers 204 and 208 are incompatible (e.g., from different proprietary vendors), the organizers 204 and 208 may dynamically access via synchronizers 205 and 209 respectively the data or information provided by a remote organizer. As a result, the remote data and the local data of the organizers can be displayed appropriately in the respective user interfaces 206 and 210.

Figure 5:
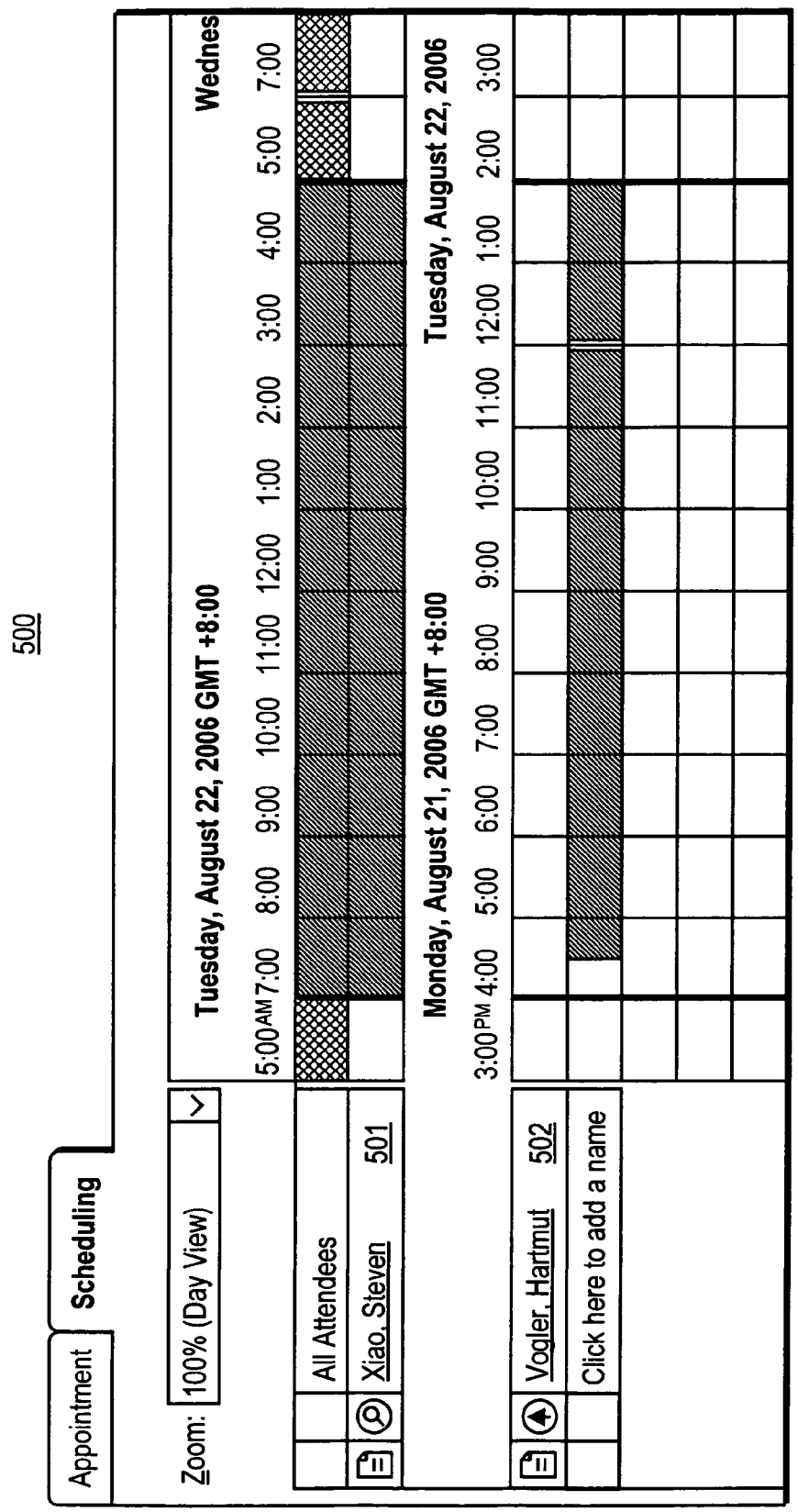
FIG. 5 is a diagram illustrating a graphical user interface for presenting schedules having different localities according to one embodiment of the invention.

For example, when a user for organizing an event of platform 201 that include a user of platform 202 as an attendee, the organizer 204 may invoke synchronizer 205 to dynamically communicate with platform 202 to access the event data of organizer 208 stored in the database or storage 211. After properly authenticating the user of platform 201, platform 202 returns the requested data (which is in a format compatible with the electronic organizer 208) to platform 201. Since the data received from platform 202 is incompatible with the electronic organizer 204, synchronizer 205 is configured to perform real time transformation of the data into a format recognizable by the electronic organizer 204. As a result both local data stored in database or storage 207 and remote data from database or storage 211 may be displayed within the user interface 206 as if they are generated locally similar to those as shown in FIG. 5.

Please note that platforms 201-202 may be associated with the same organization or enterprise entity, but using different types of electronic organizers. Further, data stored in databases or storages 207 and 211 may be stored in a centralized server or servers coupled to the network 203. Further, electronic organizers 204 and/or 208, as well as synchronizers 205 and/or 209, may be implemented in software, hardware, or a combination of both. Other configurations may exist.

Figure 3:
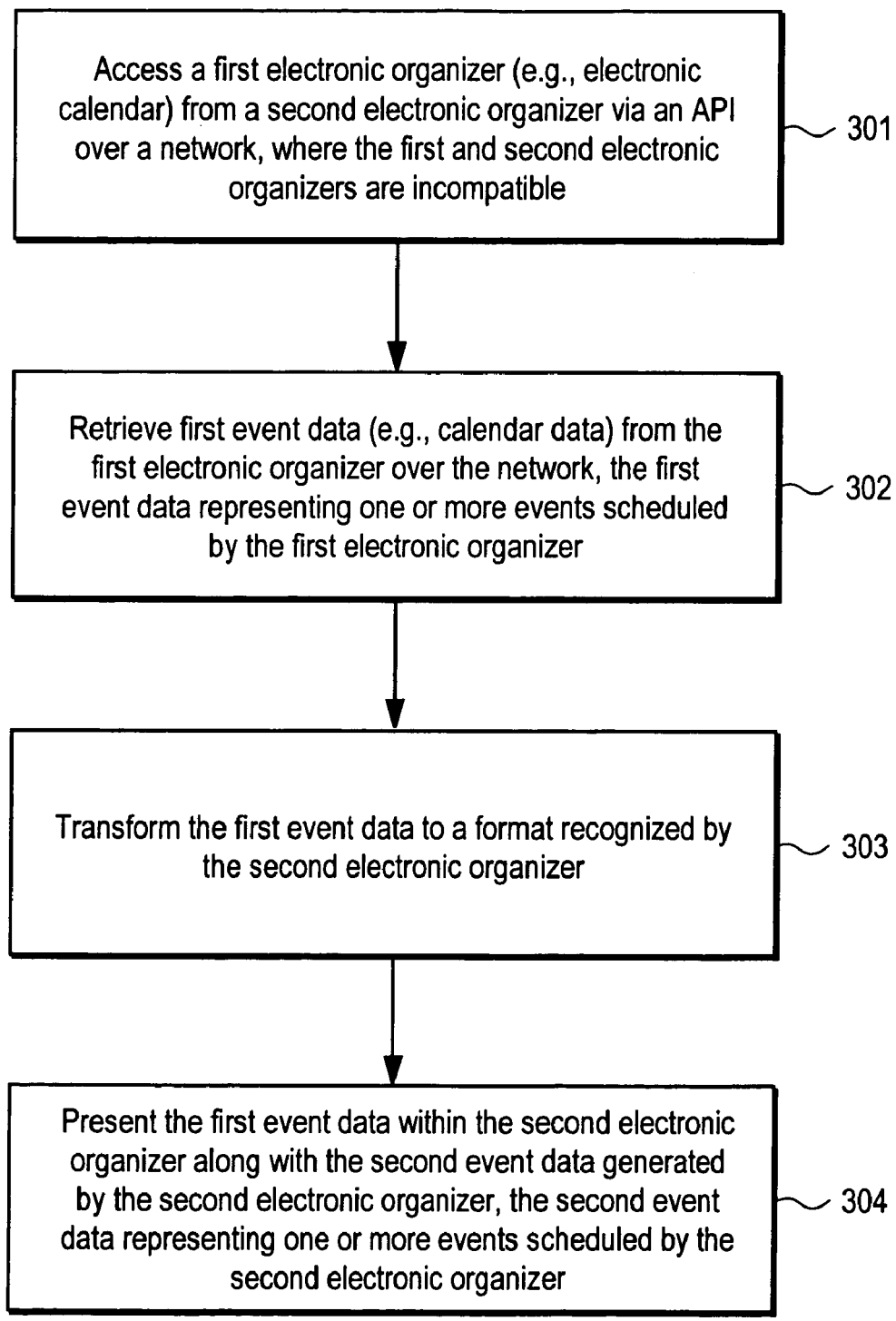
FIG. 3 is a flow diagram illustrating a process for synchronizing event data among multiple electronic organizers according to one embodiment.

FIG. 3 is a flow diagram illustrating a process for synchronizing event data among multiple electronic organizers according to one embodiment. Note that process 300 may be performed by processing logic which may include software, hardware, or a combination of both. For example, process 300 may be performed by platforms 201 and/or 202 of FIG. 2. In one embodiment, process 300 includes, but is not limited to, dynamically accessing a first event organization system over a network to retrieve a first event data representing one or more events scheduled by the first event organization system, and presenting the first event data in a second event organization system as if the first event data is scheduled by the second event organization system, wherein the first and second event organization systems are incompatible.

Referring to FIG. 3, at block 301, a second electronic organizer (e.g., second electronic calendar) accesses via an API a first electronic organizer (e.g., first electronic calendar) over a network, where the first and second electronic organizers are incompatible. At block 302, the second electronic organizer retrieves second event data (e.g., calendar data) from the first electronic organizer over the network, where the event data represents one or more events scheduled by the first electronic organizer. At block 303, the first event data is transformed (e.g., via a synchronizer) to a format recognizable by the second electronic organizer. At block 304, the transformed event data is presented in a user interface associated with the second electronic organizer, along with the second event data generated by the second electronic organizer (e.g., the local event data), where the second event data represents one or more events scheduled by the second electronic organizer. Other operations may also be performed.

Figure 4:
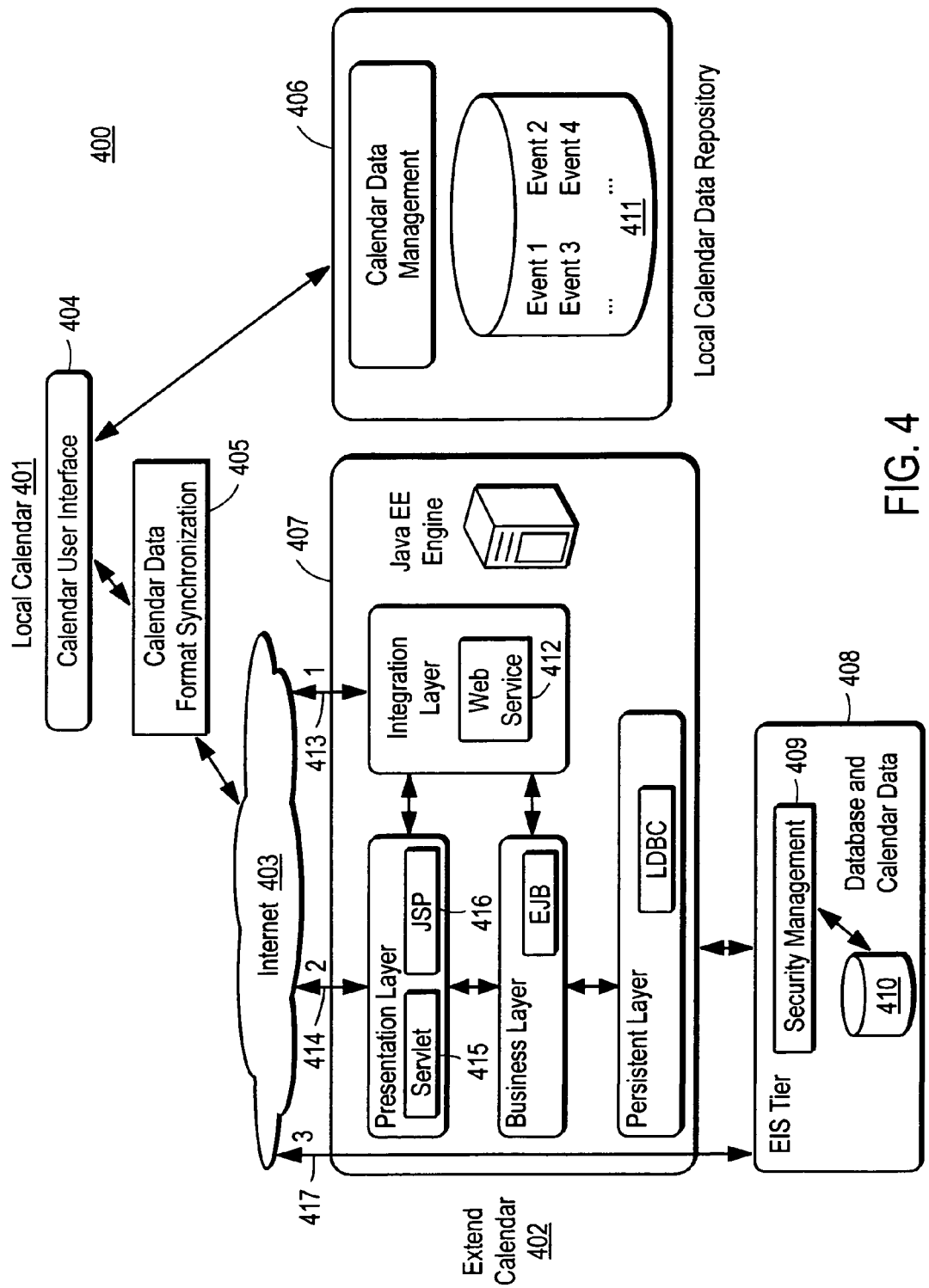
FIG. 4 is a block diagram illustrating a system configuration according to one embodiment of the invention.

According to one embodiment, an organizer's calendar tool utilizes multiple channels to read the external calendar data. FIG. 4 is a block diagram illustrating a system configuration according to one embodiment of the invention. Referring to FIG. 4, similar to the configuration 200 of FIG. 2, system 400 includes a local calendar 401 communicatively coupled to an external or remote calendar 402 over a network 405, which may be a LAN or WAN. Again, for the purposes of illustration, a calendar is utilized as an example of an electronic organizer.

In this example, similar to computing platforms 201 and/or 202 of FIG. 2, local calendar 401 includes a user interface 404, synchronizer 405, and calendar data repository 406 which may be located locally or remotely over a network. Remote calendar 402 may have architecture similar to calendar 401. In this example, for the purposes of illustration, a remote or external calendar 402 is implemented using Java technologies.

According to one embodiment, referring to FIG. 4, after a calendar application (e.g., local calendar 401) passes security of another calendar tool, such as, for example, the security management 409 of an external calendar database 408, the external calendar data 410 is transmitted to the organizer's calendar (e.g., local calendar 401), such as, for example, a calendar data format synchronization module 405. The synchronize module 405 transforms the external calendar data format to a format the organizer's calendar tool can accept or recognize. Both the external calendar data 410 and local calendar data 411 are loaded to calendar tool's UI (user interface) (e.g., user interface 404), such that the organizer can see the schedule (e.g., free time) of external attendees' as if the organizer sees the calendar data of internal people. It appears on the user interface 404 that there is no or minimum difference between external calendar data 410 and internal calendar data 411. The whole process is transparent to the organizer.

In one embodiment, the external calendar data may be stored or maintained in an enterprise information system (EIS) tier 408 of an external organization, which may be different or the same as the organization of the organizer. In order to protect the private information of external calendar data, in one embodiment, there is a security management module 409 in the EIS tier 408. There may be some authorization mechanisms (e.g., access control list or ACL mechanism), such as, for example, certification, username, password etc., to limit certain users to access calendar data 410. Furthermore, according to another embodiment, the external calendar database may only allow certain users to know the local user's schedule information such as free time. However, certain information, such as detailed information about each event may not be allowed to access by users other the owner of the calendar data. Such privileges may be configured by one with an administration privileges. For example, certain access controls may be in placed based on certain rules associated with the users, such as those set up by an identity and access management (e.g., roles, duties, and/or responsibilities) system of an EIS (e.g., EIS 408).

In a particular embodiment, there are three possible ways through which external calendar data can be transmitted to a calendar data format synchronize module. In one embodiment, there is a Java EE (enterprise edition) engine 407 on the top of EIS tier 408. EIS data 410 are exposed to users by Web services 412. External data is transmit to the calendar data format synchronize module 405 through Web services 412 via path 413.

According to an alternatively embodiment, there is a Java EE engine 407 on the top of EIS tier 408, and EIS data is exposed to a user via path 414 by a servlet 415 or Java server page (JSP) 416. External data is transmitted to the calendar data format synchronize module 405 through HTTP (hypertext transport protocol) or HTTPS (secure HTTP) protocol.

According to another embodiment, EIS tier 408 exposes its data 410 to external users by APIs (application programming interfaces) such as C++ language API or dynamic link library (DLL) directly via path 417. Therefore, the calendar data format synchronize module 405 can call the APIs of EIS 408 or use a DLL of EIS 408 to retrieve external calendar data 410 directly. Note that Java is utilized herein as an example for the illustration purposes only. It will be appreciated that other cross-platform and/or object oriented techniques may also be applied.

In one embodiment, the calendar data format synchronize module is configured to transform the external data to a predetermined format, a commonly used format such as iCalendar data format. The data format of iCalendar is defined in international standard RFC-2445 (Internet Calendaring and Scheduling Core Object Specification) by the Internet Engineering Task Force (IETF). RFC 2445 specifies an Internet standards protocol for calendar data format for the Internet communications. Currently many calendar tools support iCalendar format. If the calendar tool of organizer support iCalendar, the calendar UI can load iCalendar data from the calendar data format synchronize module directly; otherwise, the iCalendar data are transformed to the data format that organizer's calendar UI can accept or recognize. Using this architecture to synchronize the external calendar, users can access external calendar as if they use their local calendar.

New Calendar Tool UI by Taking Time Zone into Consideration

With the expansion of the global community, people are distributed all over the world. When an organizer schedules a meeting, the organizer can determine whether a certain time, such as 10:00 AM, is suitable for the organizer, as well as any attendees who are located in the same time zone with the organizer. In addition, the organizer may also determine whether this time is suitable for others in different time zones. Currently, most conventional calendars do not show the attendee's local time and normal working time (e.g., from AM 8:00 to 5:00 PM of local time) in the user interface when a user schedules a meeting. So the organizer has to calculate the attendee's local time manually before the organizer schedules a meeting. If several attendees are distributed in multiple time zones, the calculating process becomes more complex and inconvenient.

In one embodiment, an exemplary calendar tool is configured to show attendee localities, such as, for example, local time and/or time zone information, in the organizer's calendar UI. Additional information such as, for example, local time, rest time, free time etc., may also be shown in the organizer's calendar UI. The organizer just takes a glance at the UI, in order to know what time is a fine time for all attendees. Such a UI feature gives a totally new user experience, which is especially useful in a global working environment. Again, throughout this application, an electronic calendar is used as an example for an electronic organizer. However, it will be appreciated that other types of event organizers may also be utilized. Also, a local time is utilized as an example of a locality; however, other localities may also be applied.

FIG. 5 is a screen shot illustrating an example of GUI for displaying schedules in different localities according to one embodiment of the invention. As shown in GUI 500, in this example, user 501 is an organizer of a meeting, and its time zone is GMT +8:00. User 501 wants to invite 502 whose time zone is GMT −8:00 to have a meeting. In user 501's calendar tool UI, the start time of this meeting is 7:00 AM, Aug. 22, 2006, Tuesday, and the end time of this meeting is 5:00 PM, Aug. 22, 2006, Tuesday.

User 502's calendar data is read to user 501's calendar tool using some or all of the techniques described above, and kept alignment with user 501's time in the corresponding range. As for user 502, the corresponding start time of the meeting is 4:00 PM, Aug. 21, 2006, Monday; and the corresponding end time is 2:00 AM, Aug. 22, 2006, Tuesday. Because user 502's time zone is different from user 501, user 502's local time and time zone are also shown in user 501's calendar tool UI.

User 502's calendar data shows that it has an event at 4:30-5:00 PM, Aug. 21, 2006, Monday, and the rest time begins at 5:00 PM. So there is only 4:00-4:30 PM, Aug. 21, 2006, Monday available for user 501. After knowing the local time of user 502, user 501 may schedule a reasonable meeting time which is suitable for both, not only suitable for user 501. Without any additional manual computation, user 501 can arrange an international meeting by taking a glace at its calendar UI. The whole process is very simple and convenient.

Figure 6:
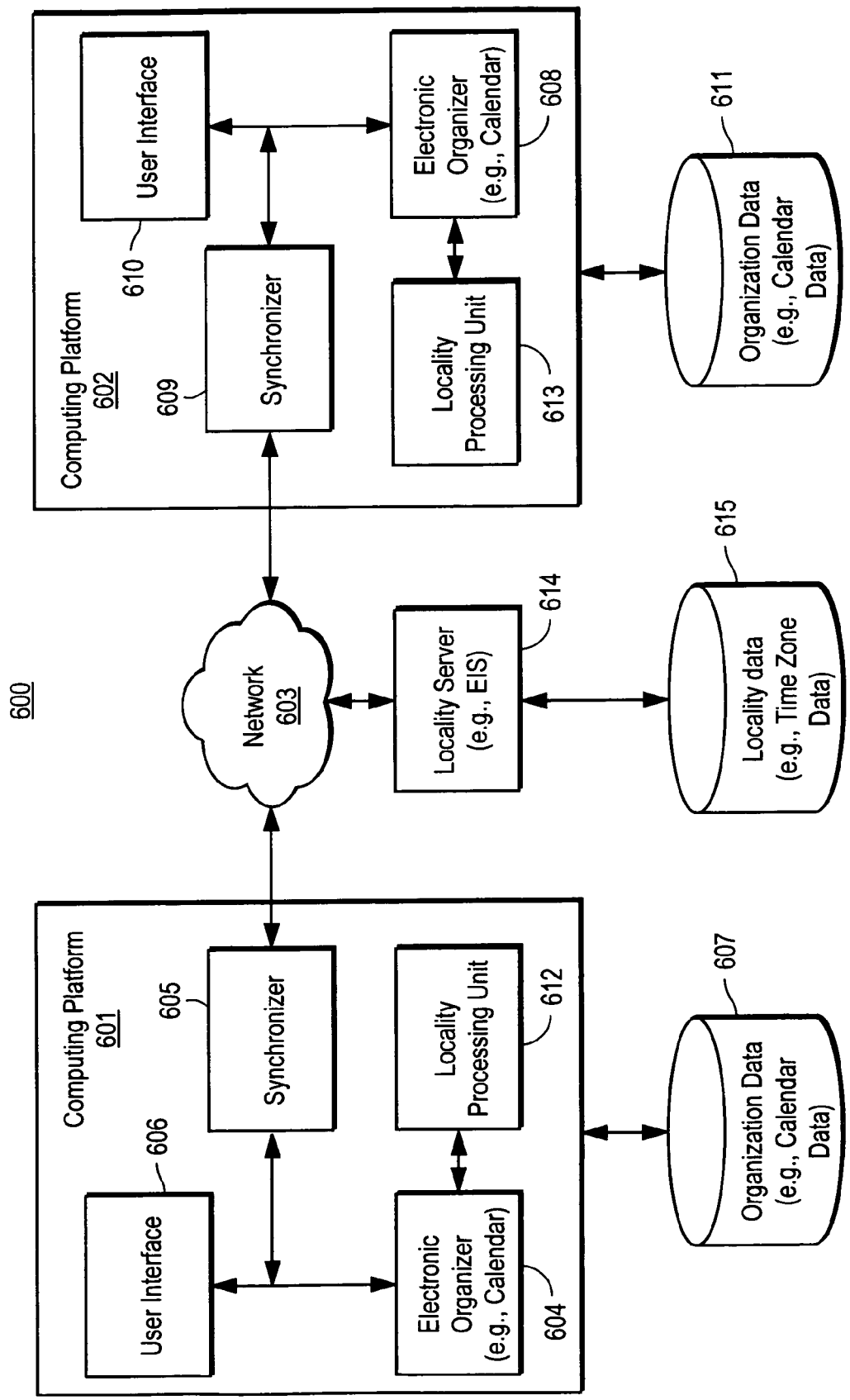
FIG. 6 is a block diagram illustrating a system configuration for organizing events in consideration of localities, according to one embodiment of the invention.

FIG. 6 is a block diagram illustrating a system configuration for organizing events in consideration of localities, according to one embodiment of the invention. For example, system 600 may be implemented as part of system 200 of FIG. 2 as alternative or different embodiments of the invention.

Referring to FIG. 6, according to one embodiment, similar to system 200 of FIG. 2, system configuration 600 includes, but is not limited to, a first computing platform 601 communicatively coupled to a second computing platform 602 over a network 603. Computing platforms 601-602 may be a personal computer (e.g., a desktop, laptop, or workstation), a portable device (e.g., a media player), a personal digital assistant (PDA), a cellular phone, a personal communicator (e.g., a Blackberry or similar devices), or a combination of at least two of these. Computing platforms 601-602 may be implemented similar to those configurations as shown in FIG. 11, which will be described in details further below.

In one embodiment, network 603 may be a local area network (LAN) (e.g., Intranet) or a wide area network (WAN) (e.g., Internet). Network 603 may include multiple networks or sub-networks. Platforms 601-602 may communicate with each other in a client-server configuration or alternatively, platforms 601-602 may communicate with each other in a peer-to-peer configuration. Platforms 601-602 may communicate with each other via a variety of communication protocols, such as, for example, TCP/IP (transport control protocol/Internet protocol) or Ethernet protocols. Although only two computing platforms 601-602 are shown for the purposes of illustration, more or fewer computing platforms may be applied.

Referring back to FIG. 6, in one embodiment, computing platform 601 includes, but is not limited to, an electronic organizer 604, user interface 606, and a synchronizer 605. Electronic organizer 604 may be a calendar application or tool available from a variety of vendors, such as Outlook from Microsoft or electronic organizer from IBM Lotus or electronic organizer from Google. Electronic organizer 604 may includes some or all of the necessary or well-known components that are normally available in a standard electronic organizer. User interface 606 may be used to present or display the data or information provided by the electronic organizer 604 including, for example, scheduled events or meetings, etc.

In addition, according to one embodiment, synchronizer 605 is coupled to the organizer 604 and/or user interface 606 to synchronize other event data or calendar data from a remote organizer of a remote platform such as organizer 608 of platform 602 over a network (e.g., network 603), using some or all of the synchronization techniques described above. Synchronizer 605 may be implemented as a part of organizer 604. Alternatively, synchronizer 605 may be implemented as a stand alone application communicatively coupled to the organizer 604 (e.g., via an API or a plug-in interface).

Further, according to one embodiment, computing platform 601 may be communicatively coupled one or more databases or storages 607 for storing data or information utilized by the organizer 604 and/or synchronizer 605. Database or storage 607 may be implemented locally with respect to platform 601 or alternatively, remotely over a network. For example, database or storage 607 may be implemented as a part of an enterprise information system (EIS) of an organization or enterprise entity, such as, an ERP (enterprise resource planning) system.

Similarly, computing platform 602 includes, but is not limited to, an electronic organizer 608, user interface 610, and a synchronizer 609. Electronic organizer 608 may be a calendar application or tool available from a variety of vendors as described above. Electronic organizer 608 may includes some or all of the necessary or well-known components that are normally available in a standard electronic organizer. User interface 610 may be used to present or display the data or information provided by the electronic organizer 608 including, for example, scheduled events or meetings, etc.

In addition, according to one embodiment, synchronizer 609 is coupled to the organizer 608 and/or user interface 610 to synchronize other event data or calendar data from a remote organizer of a remote platform such as organizer 604 of platform 601 over a network. Synchronizer 609 may be implemented as a part of organizer 608. Alternatively, synchronizer 609 may be implemented as a stand alone application communicatively coupled to the organizer 608 (e.g., via an API or a plug-in interface).

Further, according to one embodiment, computing platform 602 may be communicatively coupled one or more databases or storages 611 for storing data or information utilized by the organizer 608 and/or synchronizer 609. Database or storage 611 may be implemented locally with respect to platform 602 or alternatively, remotely over a network. For example, database or storage 611 may be implemented as a part of an enterprise information system (EIS) of an organization or enterprise entity, such as, an ERP (enterprise resource planning) system.

Furthermore, according to one embodiment, computing platform 601 further includes a locality processing unit 612 coupled to or associated with the electronic organizer 604 to process locality information of a remote event data such as those retrieved from platform 602. As result, multiple users' event schedules may be presented according to different localities associated with the different user respectively as shown in FIG. 5. Similarly, platform 602 may also include a locality processing unit 613 for similar purposes of locality processing unit 612 of platform 601. In one embodiment, the locality information may be retrieved directly from each platform, similar to a peer-to-peer configuration.

In another embodiment, time zone information for each calendar user may be stored in a database accessible by each calendar user serviced by a server. For example, as shown in FIG. 6, one or more databases 615 may be maintained in a calendar central system such as server 614 accessible over network 603. The one or more databases 615 may be used to maintain locality information such as the time zone information of each calendar user. According to one embodiment, the time zone information is updated when calendar user changes its time zone information in its computer operating system such as Microsoft Windows XP™. When a user travels to another time zone area, usually the user will change the time zone in user's computing device. So the new time zone information may be updated in the central calendar system.

According to one embodiment, when an organizer schedules a meeting with several attendees, for each attendee the calendar reads the start time and end time of the organizer's calendar tool UI. The organizer's calendar tool may determine (e.g., from a server over a network or from a respective peer) whether the attendee is in the same time zone with the organizer. If they are not in the same time zone, the organizer's calendar tool may take the attendee's time zone into consideration and transform the above start time and end time to the attendee's local time. Further, organizer's calendar may read the attendee's calendar data in the range of local start time and local end time.

When the attendees is in the same company with the organizer, according to one embodiment, the calendar tool reads attendee's calendar data from local calendar data repository (e.g., from a server over a network or from a respective peer). When the attendee is in a different company from the organizer, the calendar reads external calendar data via an API using the techniques set forth above.

If the attendee is in the same time zone with the organizer, the organizer's calendar shows the attendee's free time in the range of start time and end time in the organizer's calendar tool UI. If the attendee is in a different time zone from the organizer, the organizer's calendar shows the attendee's local time which is aligned with the organizer's time and shows the free time and rest time of attendee as well, as shown in FIG. 5.

Furthermore, according to one embodiment, the calendar tool UI of organizer can show the lunch time (e.g., from 12:00 AM to 1:00 PM of local time). The calendar tool UI may also use a predetermined or special color to show the recommending time boxes which are suitable for all attendees to schedule an event. Note that some or all of the functional units as shown in FIG. 6 may be implemented in software, hardware, or a combination of both.

Figure 7:
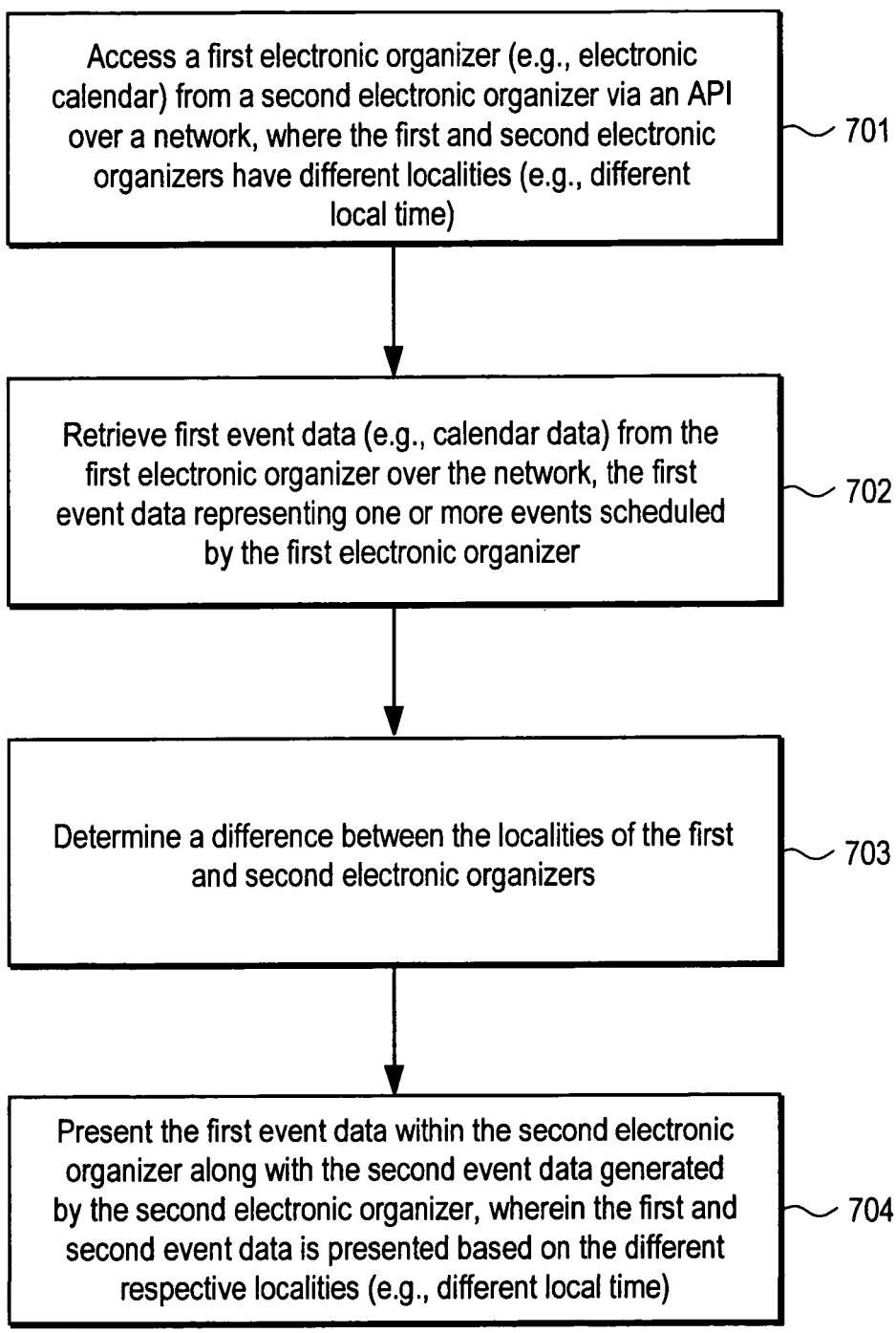
FIG. 7 is a flow diagram illustrating a process for organizing events in consideration of locality of attendees according to one embodiment of the invention.

FIG. 7 is a flow diagram illustrating a process for organizing events in consideration of locality of attendees according to one embodiment of the invention. Note that process 700 may be performed by processing logic which may include software, hardware, or a combination of both. For example, process 700 may be performed by platforms 601 and/or 602 of FIG. 6. In one embodiment, process 600 includes, but is not limited to, displaying an event in a first timeline according to a first locality associated with a first user participating the event, and displaying the event in a second timeline according to a second locality associated with a second user participating the event, wherein the first locality is different than the second locality.

Referring to FIG. 7, at block 701, processing logic accesses a first electronic organizer (e.g., electronic calendar) from a second electronic organizer over a network, where the first and second electronic organizers have different localities (e.g., different time zones). At block 702, processing logic retrieves first event data (e.g., calendar data) from the first electronic organizer over the network, where the first event data represents one or more events scheduled by the first electronic organizer. At block 703, processing logic determines a difference between the localities of the first and second electronic organizers (e.g., from a central server or via a peer-to-peer configuration). At block 704, processing logic presents the first event data within the second electronic organizer along with the second event data generated by the second electronic organizer, where the first and second event data are presented based on different localities (e.g., different time zones). Other operations may also be performed.

Reasonable Reminder Time According to Attendee's Context

As described above, currently most calendar tools provide a reminder function, but the reminder time is fixed when the organizer schedules the event. Because the attendee's contexts are different, a fixed reminder time is not reasonable for all attendees. For example, it is common that the sales people have a face to face meeting with their customers. The location for meeting is either in the sales people's company, or in the customer's company, or in the third location. If the meeting is held in customer's company or the third location, the sales people have to travel to the location for meeting. The fixed reminder time does not make sense because certain external or extrinsic factors, such as, for example, live traffic between two locations, are changing constantly or periodically.

In one embodiment, the extrinsic factors (e.g., live traffic information) are taken into consideration when designing the calendar tool's reminder function. The calendar tools will give different reasonable reminder time for each attendee according to the attendee's context. The reasonable reminder time ensures all attendees can make good use of their time, neither having to spend too much time on waiting, nor being too late for the event or meeting. Note that throughout this application, live traffic is used as an example of external or extrinsic factors; however, it is not so limited, other factors may be considered.

Currently, many map service companies, such as ESRI and Yahoo, provide live traffic service. In those map service, it will design a route for driving, and give an approximate time for driving taking the live traffic information into consideration. It also gives some other information which will influence driving, such as road constructing.

Figure 8:
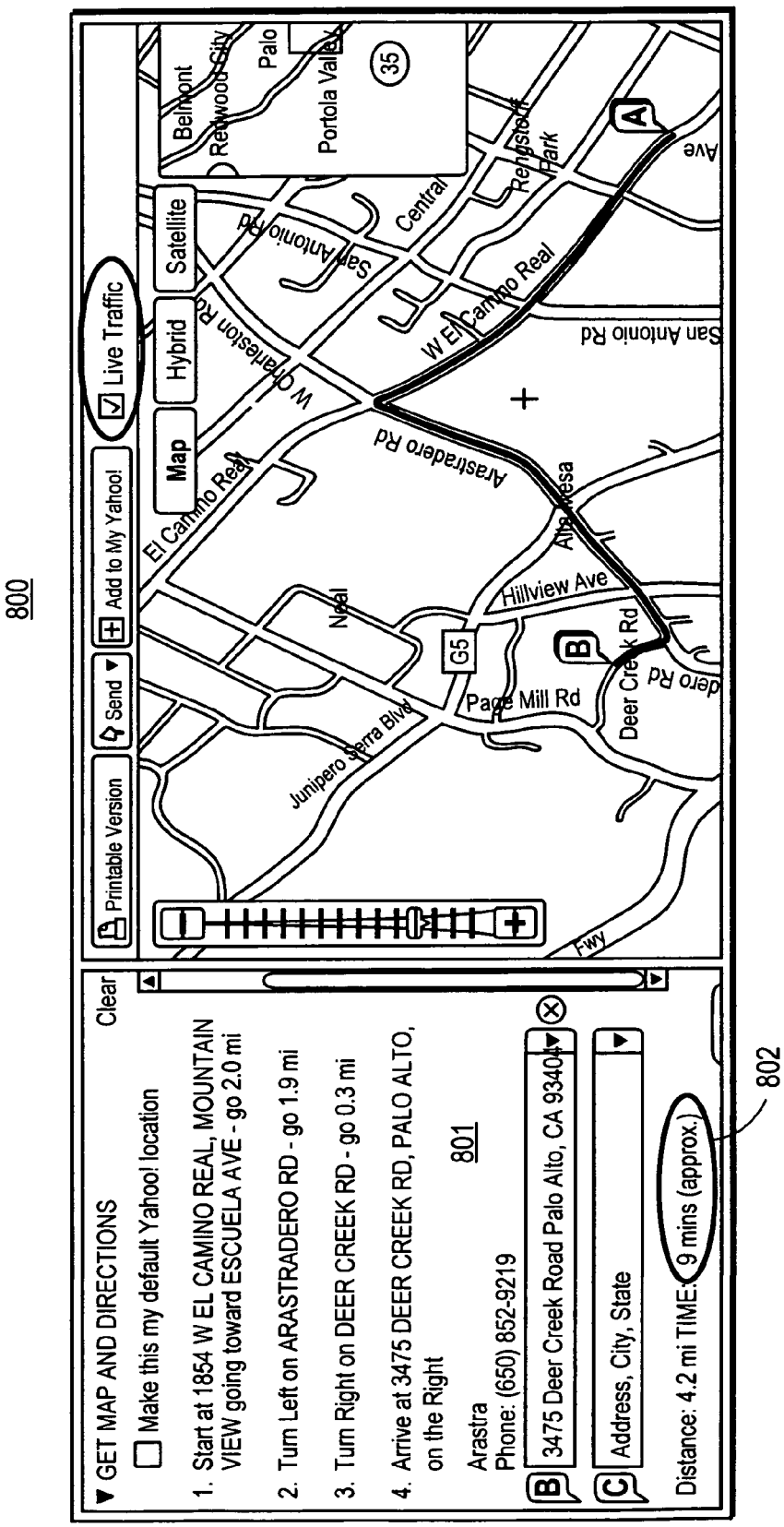
FIG. 8 is a diagram illustrating a graphical user interface for presenting schedules in consideration of real-time extrinsic factors according to one embodiment of the invention.

For example, as shown in diagram 800 of FIG. 8, a map service provider may provide the following driving direction 801 and estimate of time 802:

Start: 1854 El Camino Real West, Mountain View, Calif. 94040

End: 3475 Deer Creek Road, Palo Alto, Calif. 94304

In one embodiment, after taking the live traffic information (e.g., an estimate time 802 from the starting location to the destination) into consideration, the remainder of calendar tool can provide a reasonable reminder time to a user. In one embodiment, the calendar tool provides an interface where the calendar tool's user can register its address. The calendar tool scans each event in local calendar data repository periodically, and the reminder time is computed accordingly.

Figure 9:
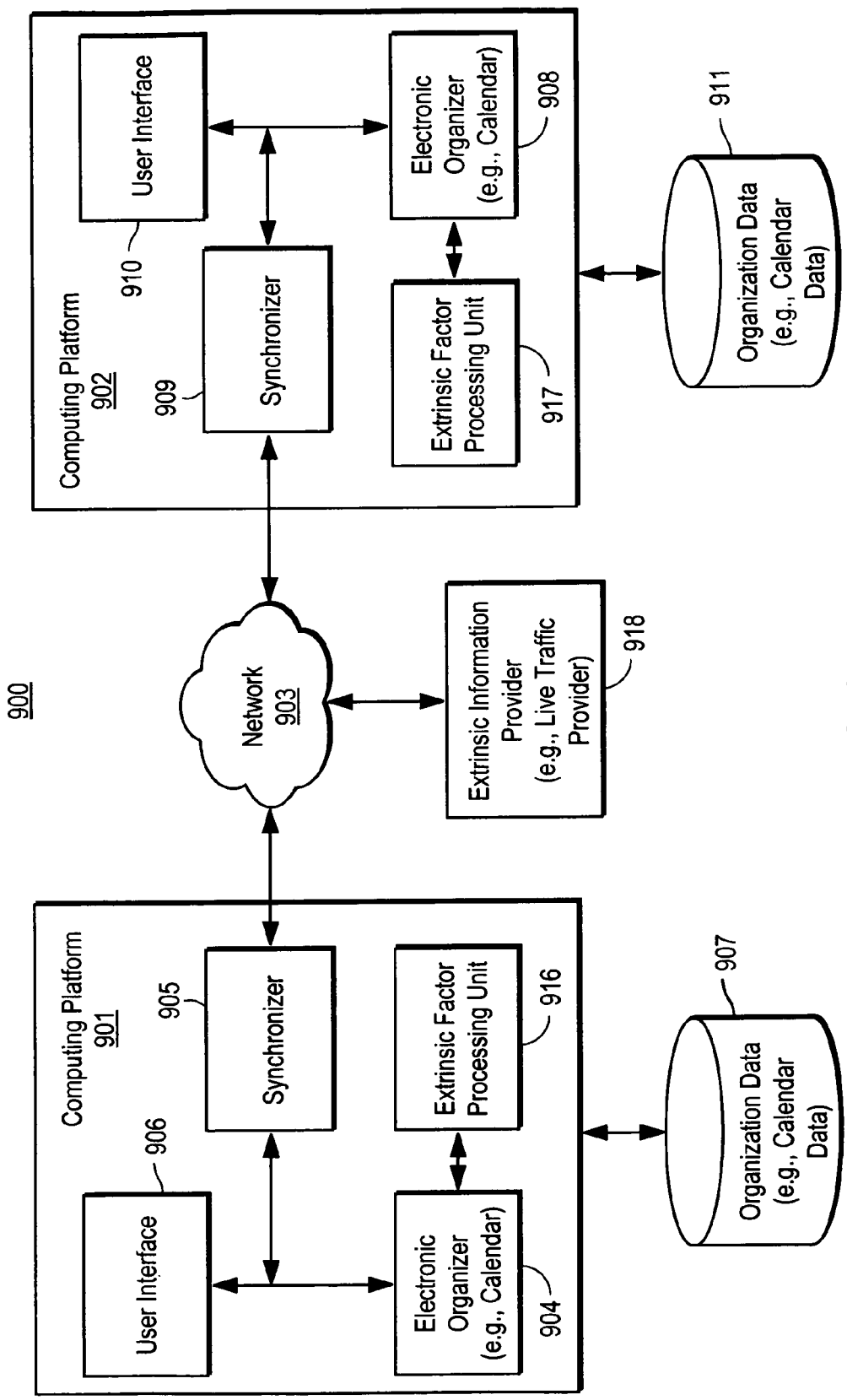
FIG. 9 is a block diagram illustrating a system configuration for organizing events in consideration of extrinsic factors, according to one embodiment of the invention.

FIG. 9 is a block diagram illustrating a system configuration for organizing events in consideration of extrinsic factors, according to one embodiment of the invention. For example, system 900 may be implemented as part of system 200 of FIG. 2 and/or system 600 of FIG. 6 as alternative or different embodiments of the invention.

Referring to FIG. 9, according to one embodiment, similar to system 200 of FIG. 2 and/or system 600 of FIG. 6, system configuration 900 includes, but is not limited to, a first computing platform 901 communicatively coupled to a second computing platform 902 over a network 903, which may be a LAN or WAN. Computing platforms 901-902 may be a personal computer (e.g., a desktop, laptop, or workstation), a portable device (e.g., a media player), a personal digital assistant (PDA), a cellular phone, a personal communicator (e.g., a Blackberry or similar devices), or a combination of at least two of these. Computing platforms 601-602 may be implemented similar to those configurations as shown in FIG. 11, which will be described in details further below.

Referring back to FIG. 9, in one embodiment, computing platform 901 includes, but is not limited to, an electronic organizer 904, user interface 906, and a synchronizer 905. Electronic organizer 904 may be a calendar application or tool available from a variety of vendors, such as Outlook from Microsoft or electronic organizer from IBM Lotus or electronic organizer from Google. Electronic organizer 904 may includes some or all of the necessary or well-known components that are normally available in a standard electronic organizer. User interface 906 may be used to present or display the data or information provided by the electronic organizer 904 including, for example, scheduled events or meetings, etc.

In addition, according to one embodiment, synchronizer 905 is coupled to the organizer 904 and/or user interface 906 to synchronize other event data or calendar data from a remote organizer of a remote platform such as organizer 908 of platform 902 over a network (e.g., network 903), using some or all of the synchronization techniques described above. Synchronizer 905 may be implemented as a part of organizer 904. Alternatively, synchronizer 905 may be implemented as a stand alone application communicatively coupled to the organizer 904 (e.g., via an API or a plug-in interface).

Further, according to one embodiment, computing platform 901 may be communicatively coupled one or more databases or storages 907 for storing data or information utilized by the organizer 904 and/or synchronizer 905. Database or storage 907 may be implemented locally with respect to platform 901 or alternatively, remotely over a network. For example, database or storage 907 may be implemented as a part of an enterprise information system (EIS) of an organization or enterprise entity, such as, an ERP (enterprise resource planning) system.

Similarly, computing platform 902 includes, but is not limited to, an electronic organizer 908, user interface 910, and a synchronizer 909. Electronic organizer 908 may be a calendar application or tool available from a variety of vendors as described above. Electronic organizer 908 may includes some or all of the necessary or well-known components that are normally available in a standard electronic organizer. User interface 910 may be used to present or display the data or information provided by the electronic organizer 908 including, for example, scheduled events or meetings, etc.

In addition, according to one embodiment, synchronizer 909 is coupled to the organizer 908 and/or user interface 910 to synchronize other event data or calendar data from a remote organizer of a remote platform such as organizer 904 of platform 901 over a network. Synchronizer 909 may be implemented as a part of organizer 908. Alternatively, synchronizer 909 may be implemented as a stand alone application communicatively coupled to the organizer 908 (e.g., via an API or a plug-in interface).

Further, according to one embodiment, computing platform 902 may be communicatively coupled one or more databases or storages 911 for storing data or information utilized by the organizer 908 and/or synchronizer 909. Database or storage 911 may be implemented locally with respect to platform 902 or alternatively, remotely over a network. For example, database or storage 911 may be implemented as a part of an enterprise information system (EIS) of an organization or enterprise entity, such as, an ERP (enterprise resource planning) system.

Furthermore, according to one embodiment, computing platform 901 further includes an extrinsic factor or information processing unit 916 coupled to or associated with the electronic organizer 904 to process extrinsic information (e.g., live traffic information) retrieved from an extrinsic information provider 918 (e.g., a live traffic or map service provider). As a result, a reminder service can be provided to a user based on the user's respective context, such as locality of the respective user. Similarly, platform 902 may also include an extrinsic factor or information processing unit 917 for similar purposes of the extrinsic factor or information processing unit 916 of platform 901.

In a particular embodiment, the calendar tool extracts a location of a meeting from the event organizer and takes the address of calendar tool's user as the start point and the location of meeting as end point. The calendar tool then takes the live traffic as an extrinsic parameter and communicates with a map service provider to get the approximate time and route for reach the destination. Assumed that the approximate driving time is marked as X. If the location of meeting is in the same address of the user, X is assigned to zero. In order to avoid some accidental issues on the road, the reminder time may increase an X certain percent, such as, for example 10%. That is to say X<=X+X*10%.

Assumed that the user of calendar tool needs a certain time to prepare necessary documents for the meeting. Here, the calendar tool may mark the time for preparation of meeting as Y, where Y can be a fixed time, such as, for example, 10 minuses. Therefore, the reasonable time for a reminder may be X+Y. When the reminding time arrives, a pop-up message may be displayed to notify the user to prepare the meeting before the time X+Y. In one embodiment, a map for driving is also shown. In addition, according to one embodiment, if the user of calendar also registers its mobile device, the map for driving may be transmitted to its mobile device.

Figure 10:
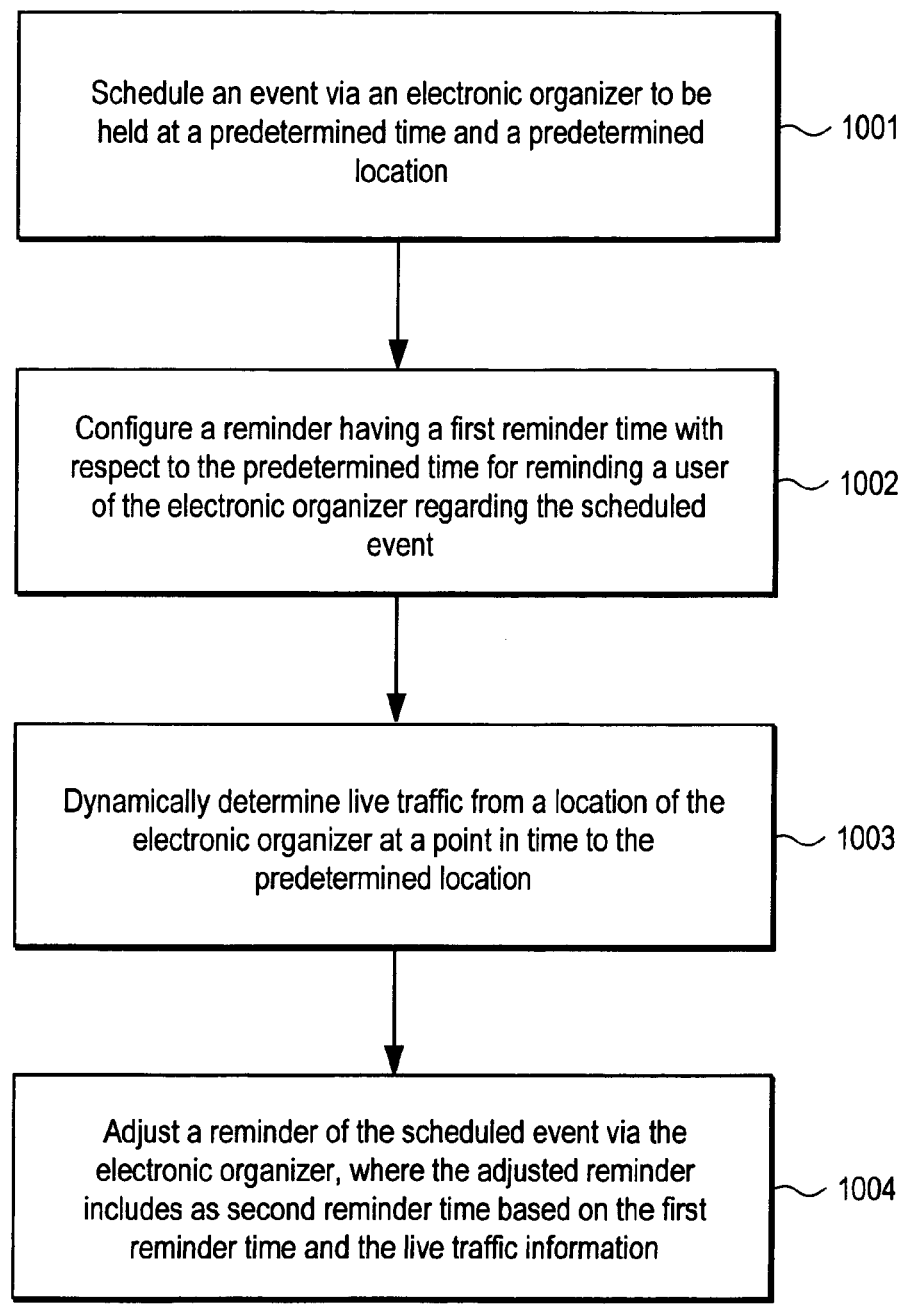
FIG. 10 is a flow diagram illustrating a process for organizer an event in consideration of an extrinsic factor according to one embodiment.

FIG. 10 is a flow diagram illustrating a process for organizer an event in consideration of an extrinsic factor according to one embodiment. Note that process 1000 may be performed by processing logic which may include software, hardware, or a combination of both. For example, process 1000 may be performed by platforms 901 and/or 902 of FIG. 9. In one embodiment, process 1000 includes, but is not limited to, in response to an event held at a predetermined time of a predetermined location and scheduled via an electronic event organizer, dynamically determining a real-time extrinsic factor affecting traveling time from a location of the electronic event organizer to the predetermined location, and configuring a reminder of the event via the electronic event organizer, the reminder having an amount of time with respect to the predetermined time based on the determined real-time extrinsic factor.

Referring to FIG. 10, at block 1001, processing logic schedules an event via an electronic organizer to be held at a predetermined time and a predetermined location. At block 1002, processing logic configures a reminder having a first reminder time with respect to the predetermined time (e.g., a period of time ahead of the scheduled event time) for reminding a user of the electronic organizer regarding the scheduled event. At block 1003, processing logic dynamically determines one or more real-time extrinsic factors (e.g., live traffic information) that will affect the time to reach the location of the event from a location of the electronic organizer. In one embodiment, a third party service provider (e.g., live traffic information provider) may be invoked for such a purpose. At block 1004, processing logic adjusts the reminder of the scheduled event based on the real-time factors. Other operations may also be performed.

FIG. 11 is a block diagram of a digital processing system, which may be used with one embodiment of the invention. For example, the system 1100 may be used as a client and/or a server as described above with respect to FIGS. 2, 6, and 9. Note that while FIG. 11 illustrates various components of a computer system, it is not intended to represent any particular architecture or manner of interconnecting the components, as such details are not germane to the present invention. It will also be appreciated that network computers, handheld computers, cell phones and other data processing systems which have fewer components or perhaps more components may also be used with the present invention.

As shown in FIG. 11, the system 1100, which is a form of a data processing system, includes a bus or interconnect 1102 which is coupled to one or more microprocessors 1103 and a ROM 1107, a volatile RAM 1105, and a non-volatile memory 1106. The microprocessor 1103, which may be, for example, a PowerPC microprocessor or an Intel Pentium processor, is coupled to cache memory 1104 as shown in the example of FIG. 11. The bus 1102 interconnects these various components together and also interconnects these components 1103, 1107, 1105, and 1106 to a display controller and display device 1108, as well as to input/output (I/O) devices 1110, which may be mice, keyboards, modems, network interfaces, printers, and other devices which are well-known in the art.

Typically, the input/output devices 1110 are coupled to the system through input/output controllers 1109. The volatile RAM 1105 is typically implemented as dynamic RAM (DRAM) which requires power continuously in order to refresh or maintain the data in the memory. The non-volatile memory 1106 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 11 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1102 may include one or more buses connected to each other through various bridges, controllers, and/or adapters, as is well-known in the art. In one embodiment, the I/O controller 1109 includes a USB (Universal Serial Bus) adapter for controlling USB peripherals. Alternatively, I/O controller 1109 may include an IEEE-1394 adapter, also known as FireWire adapter, for controlling FireWire devices.

Thus, techniques for organizing events via an electronic organizer have been described herein. Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed in an Enterprise Information System (EI system) of an organization, wherein the method comprises:

retrieving, via a processor synchronizer of the EI system, a first event data set representing one or more events scheduled via a first electronic calendar system that is external to the organization, wherein the first electronic calendar system stores event data in a format that is incompatible with a plurality of user calendar applications within the organization and provides the first data set to the processor synchronizer in a corresponding incompatible format;

transforming, via the processor synchronizer of the EI system, the first event data set to a standardized defined event data format and transforming the first event data set from the standardized event data format to a third data format recognized by the plurality of user calendar applications within the organization when the plurality of user calendar applications within the organization do not support the standardized defined event data format;

storing, via a centralized server database of the EI system, the first event data set as transformed by the processor synchronizer of the EI system;

storing, via the centralized server database of the EI system, a second event data set representing one or more events scheduled by a second electronic calendar system, wherein the second electronic calendar system operates within the organization in conjunction with the plurality of user calendar applications of the organization; and presenting, via a graphical user interface of one of the plurality of user calendar applications within the organization, a scheduling view having at least a subset of the first event data set representing the one or more events as scheduled by the first electronic calendar system as transformed by the processor synchronizer into the standardized event data format or as transformed into the third data format, and further presenting within the same scheduling view, at least a subset of the second event data set representing the one or more events as scheduled by the second electronic calendar system.

2. The method of claim 1, further comprising scheduling a new event within the second electronic calendar system in view of the first and second event data sets.

3. The method of claim 2, wherein the new event is scheduled without conflicts between the one or more events scheduled by first and second electronic calendar systems based on the first and second event data sets.

4. The method of claim 3, further comprising transmitting schedule information associated with the new event from the second electronic calendar system via the EI system to the first electronic calendar system over a network.

5. The method of claim 1, wherein the one or more events represented by the first event data set are scheduled based on a first locality associated with a first user of first electronic calendar system, wherein the one or more events represented by the second event data set are scheduled based on a second locality associated with a second user of the second electronic calendar system, and wherein the first and second localities are different.

6. The method of claim 5, further comprising:

displaying the first subset of the first event data set in a first timeline with a first local time associated with the first user of the first electronic calendar event system; and displaying the second subset of the second event data set in a second timeline with a second local time associated with the second user of the second electronic calendar system, wherein the first timeline and the second timeline are displayed in the same window of the scheduling view and aligned with each other according to a common absolute time.

7. The method of claim 6, wherein the one or more events represented by the second event data set comprise a reminder of a prescheduled event to be held at a predetermined location, wherein the reminder is scheduled in consideration of live traffic information from a location associated with the second user of the second electronic calendar system relative to the predetermined location of the prescheduled event.

8. An article of manufacture having instructions stored on a machine-readable medium that, when executed by a processor within an Enterprise Information System (EI system) of an organization, the instructions cause the EI system to perform a method comprising:

retrieving a first event data set representing one or more events scheduled via a first electronic calendar system that is external to the organization, wherein the first electronic calendar system stores event data in a format that is incompatible with a plurality of user calendar applications within the organization and provides the first data set to the processor synchronizer in a corresponding incompatible format;

transforming, via a processor synchronizer of the EI system, the first event data set to a standardized defined event data format and transforming the first event data set from the standardized event data format to a third data format recognized by the plurality of user calendar applications within the organization when the plurality of user calendar applications within the organization do not support the standardized defined event data format;

storing, via a centralized server database of the EI system, the first event data set as transformed by the processor synchronizer of the EI system;

storing, via the centralized server database of the EI system, a second event data set representing one or more events scheduled by a second electronic calendar system, wherein the second electronic calendar system operates within the organization in conjunction with the plurality of user calendar applications of the organization; and presenting, via a graphical user interface of one of the plurality of user calendar applications within the organization, a scheduling view having at least a subset of the first event data set representing the one or more events as scheduled by the first electronic calendar system as transformed by the processor synchronizer into the standardized event data format or as transformed into the third data format, and further presenting within the same scheduling view, at least a subset of the second event data set representing the one or more events as scheduled by the second electronic calendar system.

9. The article of manufacture of claim 8, wherein the method further comprises:

scheduling a new event within the second electronic calendar system in view of the first and second event data sets.

10. The article of manufacture of claim 9, wherein the new event is scheduled without conflicts between the one or more events scheduled by first and second electronic calendar systems based on the first and second event data sets.

11. The article of manufacture of claim 10, wherein the method further comprises:

transmitting schedule information associated with the new event from the second electronic calendar system via the EI system to the first electronic calendar system over a network.

12. The article of manufacture of claim 8, wherein the one or more events represented by the first event data set are scheduled based on a first locality associated with a first user of first electronic calendar system, wherein the one or more events represented by the second event data set are scheduled based on a second locality associated with a second user of the second electronic calendar system, and wherein the first and second localities are different.

13. The article of manufacture of claim 12, wherein the method further comprises:

displaying the first subset of the first event data set in a first timeline with a first local time associated with the first user of the first electronic calendar system; and displaying the second subset of the second event data set in a second timeline with a second local time associated with the second user of the second electronic calendar system, wherein the first timeline and the second timeline are displayed in the same window of the scheduling view and aligned with each other according to a common absolute time.

14. The article of manufacture of claim 13, wherein the one or more events represented by the second event data set comprise a reminder of a prescheduled event to be held at a predetermined location, wherein the reminder is scheduled in consideration of live traffic information from a location associated with the second user of the second electronic calendar system relative to the predetermined location of the prescheduled event.

15. An Enterprise Information System (EI system) of an organization comprising:
- a processor synchronizer to retrieve a first event data set representing one or more events scheduled via a first electronic calendar system that is external to the organization, wherein the first electronic calendar system to store event data in a format that is incompatible with a plurality of user calendar applications within the organization and to provide the first data set to the processor synchronizer in a corresponding incompatible format;
- the processor synchronizer to further transform the first event data set to a standardized defined event data format and transforming the first event data set from the standardized event data format to a third data format recognized by the plurality of user calendar applications within the organization when the plurality of user calendar applications within the organization do not support the standardized defined event data format;
- a centralized server database to store the first event data set as transformed by the processor synchronizer of the EI system;
- the centralized server database to further store a second event data set representing one or more events scheduled by a second electronic calendar system, wherein the second electronic calendar system operates within the organization in conjunction with the plurality of user calendar applications of the organization; and
- a graphical user interface communicatively interfaced with the EI system and associated with one of the plurality of user calendar applications within the organization to present a scheduling view having at least a subset of the first event data set representing the one or more events as scheduled by the first electronic calendar system as transformed by the processor synchronizer into the standardized event data format or as transformed into the third data format, and the graphical user interface to further present within the same scheduling view, at least a subset of the second event data set representing the one or more events as scheduled by the second electronic calendar system.

16. The EI system of claim 15, wherein the second electronic calendar system to schedule a new event in view of the first and second event data sets.

17. The EI system of claim 16, wherein the new event is scheduled without conflicts between the one or more events scheduled by first and second electronic calendar systems based on the first and second event data sets.

18. The EI system of claim 17, wherein the processor synchronizer to further transmit schedule information associated with the new event from the second electronic calendar system via the EI system to the first electronic calendar system over a network.

19. The EI system of claim 15, wherein the one or more events represented by the first event data set are scheduled based on a first locality associated with a first user of first electronic calendar system, wherein the one or more events represented by the second event data set are scheduled based on a second locality associated with a second user of the second electronic calendar system, and wherein the first and second localities are different.

20. The EI system of claim 19, wherein the one or more events represented by the second event data set comprise a reminder of a prescheduled event to be held at a predetermined location, wherein the reminder is scheduled in consideration of live traffic information from a location associated with the second user of the second electronic calendar system relative to the predetermined location of the prescheduled event.

* * * * *